(12) United States Patent
Ferguson

(10) Patent No.: US 7,690,045 B2
(45) Date of Patent: Mar. 30, 2010

(54) ON-THE-FLY CONTENTS-BASED ACCESS CONTROL SYSTEM

(75) Inventor: Niels Thomas Ferguson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1231 days.

(21) Appl. No.: 11/227,706

(22) Filed: Sep. 15, 2005

(65) Prior Publication Data

US 2007/0061896 A1    Mar. 15, 2007

(51) Int. Cl.
*G06F 7/04* (2006.01)
*H04L 9/00* (2006.01)
*G06F 11/30* (2006.01)

(52) U.S. Cl. ............... 726/30; 726/27; 726/28; 726/29; 726/16; 726/19; 713/187; 713/188

(58) Field of Classification Search ..................... 726/30
See application file for complete search history.

(56) References Cited

U.S. PATENT DOCUMENTS

| 6,546,486 | B1 * | 4/2003 | Perlman et al. | 713/153 |
| 6,611,850 | B1 * | 8/2003 | Shen | 707/204 |
| 7,496,956 | B1 * | 2/2009 | Viljoen et al. | 726/11 |
| 2003/0051149 | A1 * | 3/2003 | Robert | 713/189 |

* cited by examiner

*Primary Examiner*—Longbit Chai
(74) *Attorney, Agent, or Firm*—Woodcock Washburn LLP

(57) ABSTRACT

An access control system applies contents-based policies to data that is being transferred. This transfer can be between different computers, different operating systems on a single computer, different applications within on the same operating system, or different parts of the same operating system, for example. Data is scanned at a scan engine associated with a security reference monitor (SRM) as the data is being transmitted, on-the-fly. The data is forwarded directly to the recipient, so the data is not stored at the SRM. The data is encrypted at the SRM as it comes by, and the key is revealed to the recipient if it is subsequently determined that the transfer is allowed.

16 Claims, 3 Drawing Sheets

ON-THE-FLY CONTENTS-BASED ACCESS CONTROL SYSTEM

BACKGROUND OF THE INVENTION

The heart of a computer security system is the security reference monitor (SRM). The SRM is the piece of a computer security system that decides whether a particular action is allowed or not, using, for example, an access control list (ACL). Traditionally, an SRM makes a decision based on the subject (who is doing the action), the object (what item is being accessed), and the action (what is being done). The ACLs encode the access rules, and the SRM decides whether an action is allowed or not. In some cases, the SRM decides whether a certain action (such as reading or writing a file) is allowed irrespective of the data being transferred (read or written).

More recently, SRMs have started making decisions based on the actual data. Examples include anti-virus scanners which restrict access to objects (typically file and network resources) based on the contents of the data. Data that appears to contain a virus is not allowed to be accessed or transferred. Other contents-based SRMs can be constructed. For example, a system may be created that, as a basic policy, prevents files that contain the string "Company Confidential" from being sent outside the corporate network.

A block diagram of a conventional contents-based access control system is shown in FIG. 1. An SRM 10 receives data and stores a copy of the data in a memory or associated storage device 15, prior to determining whether the data should be transmitted to a recipient 20. Conventional contents-based access control systems store a copy of the data, and then determine if it is acceptable. Thus, a conventional system stores a copy of the data, even if the data is bad (e.g., not allowed to be transferred or used by a recipient).

Some conventional contents-based access control systems do not actually store the data, but forward it to the recipient immediately. However, this is only secure in situations where the recipient is trusted by the SRM not to use the data until the SRM has decided whether the data is allowed to be used or not, and to delete the data when the SRM decides it should not be used. In effect, in this type of implementation the SRM implements the storage device 15 by having the recipient perform the (trusted) storage function. This is functionally equivalent to FIG. 1.

An example conventional system looks at the entire contents before they can make a decision about whether the data should be restricted or not. For example, if the "Company Confidential" string appears anywhere in the file, the entire file is considered to be confidential, and should not be permitted to be sent outside the corporate network. Similarly, if a virus signature appears anywhere in a data transfer, the whole data transfer should be disallowed. Thus, the first part of the file should not be revealed to the recipient if the last part of the file leads to the decision that the transfer should not be allowed.

This property makes it difficult to integrate contents-based SRMs in streaming communications. For example, an email filtering system would have to receive the whole email, store it, present the data to the SRM to let it decide whether it can be passed on or not, and, if allowed, send the email on. The extra storage step adds significant performance cost, and requires sufficient storage for the data. Without a contents-based SRM, the data could be sent onward as it is being received.

One particular example is in a so-called red/green system where a Hypervisor (or Host) creates one or more partitions, each of which runs its own operating system. Different partitions have different trust levels, and a typical setup has at least one low-trust partition called 'red', and one high-trust partition called 'green'. This system supports file transfers between the red and green partitions. The host (which is the central authority) should enforce the security policies, including contents-based security policies. But storing the whole file that is being transferred is expensive, and the host might not have sufficient disk space to store a large file.

A similar problem occurs when contents-based security policies are applied to other communication mediums. Ideally, the security policy is enforced on the data in transit, but conventional contents-based policies require all of the data to be analyzed before the first part of the data is sent to the recipient.

Some security systems apply security policies on data as it is being transferred. If the policy depends on the actual data in the transfer, then the system must store a copy of the data and apply the policy engine to the data before it can decide whether to allow the transfer to occur. It would be desirable to remove the need for storing a copy of the data.

SUMMARY OF THE INVENTION

An access control system applies contents-based policies to data that is being transferred. This transfer can be between different computers, different operating systems on a single computer, different applications within on the same operating system, or different parts of the same operating system, for example. Data is scanned at a scan engine associated with a security reference monitor (SRM) as the data is being transmitted, on-the-fly. The data is forwarded directly to the recipient, so the data is not stored at the SRM. The data is encrypted at the SRM as it comes by, and the key is revealed to the recipient if it is subsequently determined that the transfer is allowed.

For example, for each transfer, the access control system generates a new random encryption key such as a 256-bit AES (Advanced Encryption Standard) key. As the data is being transferred, the access control system processes the data through the contents-based SRM to determine whether the transfer will be allowed. The SRM may operate in streaming mode where it sees the data a little bit at a time. The access control system also encrypts the data with the chosen key before sending it on to the recipient.

At the end of the transfer, the SRM determines whether the transfer should be allowed or not. If the transfer is allowed, the access control system sends the encryption key to the recipient. If the transfer is not allowed, the access control system does not send the encryption key to the recipient. Thus, the recipient does not get the real data, but instead gets the encrypted data. If the transfer is allowed, the recipient receives the key and can now decrypt the actual data.

DETAILED DESCRIPTION OF ILLUSTRATIVE EMBODIMENTS

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment. The skilled artisan will readily appreciate that the methods and systems described herein are merely exemplary and that variations can be made without departing from the spirit and scope of the invention.

An access control system applies contents-based policies to data that is being transferred. This transfer can be between different entities, such as computers, different operating systems on a single computer, different applications within the same operating system, or different parts of the same operating system, for example.

Figure 1:
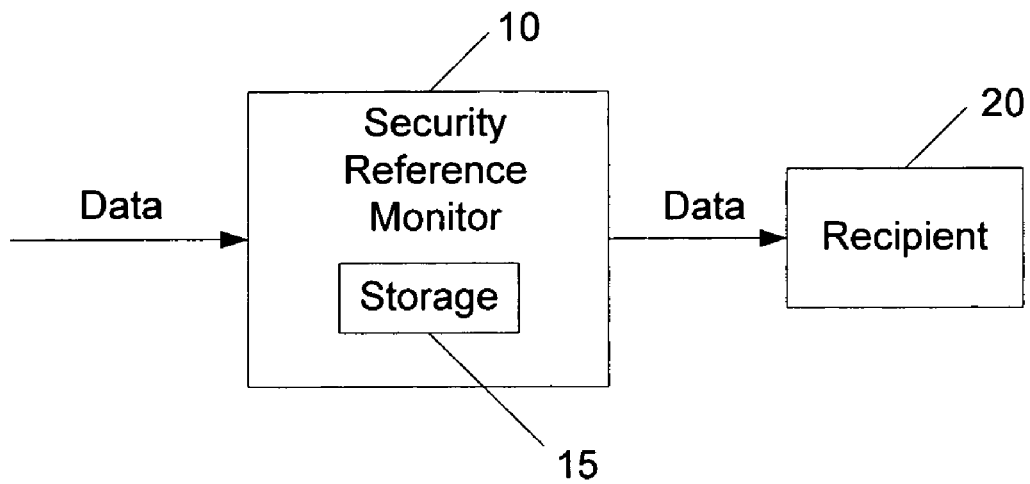
FIG. 1 is a block diagram of a conventional contents-based access control system.
Figure 2:
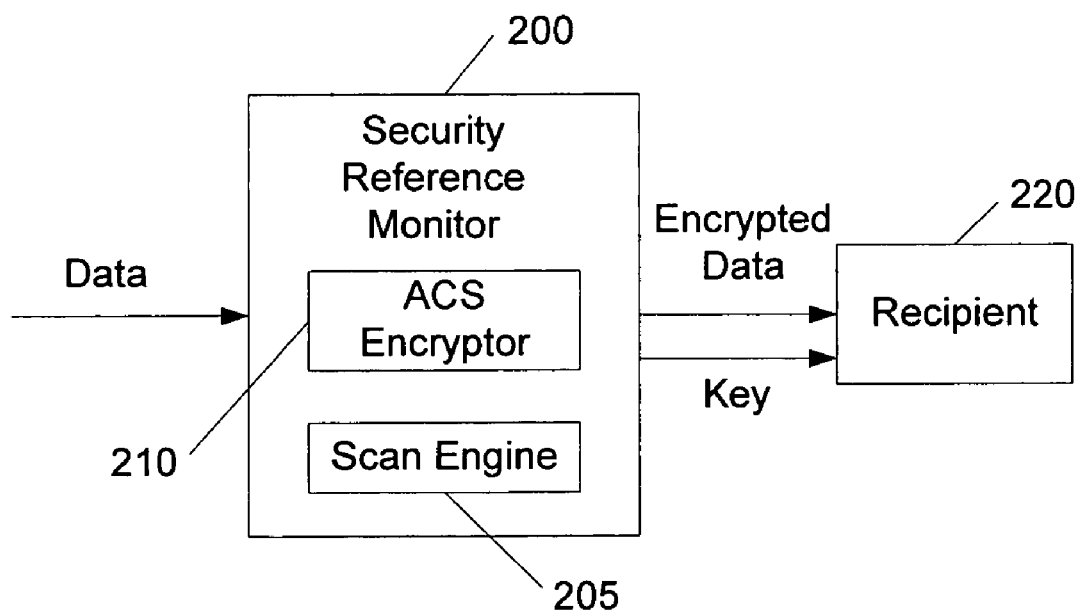
FIG. 2 is a block diagram of an exemplary access control system.

FIG. 2 is a block diagram of an exemplary access control system. In accordance with aspects of the invention, the data is scanned at a scan engine 205 associated with an SRM 200 as the data is being transmitted, on-the-fly, from a first entity (e.g., a first computer system, operating system, or application) to a recipient, such as a second computer system, operating system, or application, for example. The data is forwarded directly to the recipient 220, so the data is not stored at the SRM 200. The data is encrypted at the SRM 200 as it comes by, and the key is revealed to the recipient 220 if it is subsequently determined that the transfer is allowed.

For example, for each transfer, the access control system (ACS) generates a new random encryption key such as a 256-bit AES (Advanced Encryption Standard) key. As the data is being transferred, the access control system processes the data through the contents-based SRM to determine whether the transfer will be allowed. Desirably, the SRM operates in streaming mode where it sees the data a little bit at a time. The access control system also encrypts the data with the chosen key before sending it on to the recipient.

At the end of the transfer, the SRM determines whether the transfer should be allowed or not. If the transfer is allowed, the access control system sends the encryption key to the recipient. If the transfer is not allowed, the access control system does not send the encryption key to the recipient. Thus, the recipient does not initially get the actual unencrypted data, but instead gets the encrypted data. If the transfer is allowed, the recipient receives the key and can now decrypt the actual data. The recipient has to process the data twice: once to receive and store it, and once to decrypt it. Thus, the need to store the data in a place where the SRM can see it all at once is eliminated.

Figure 3:
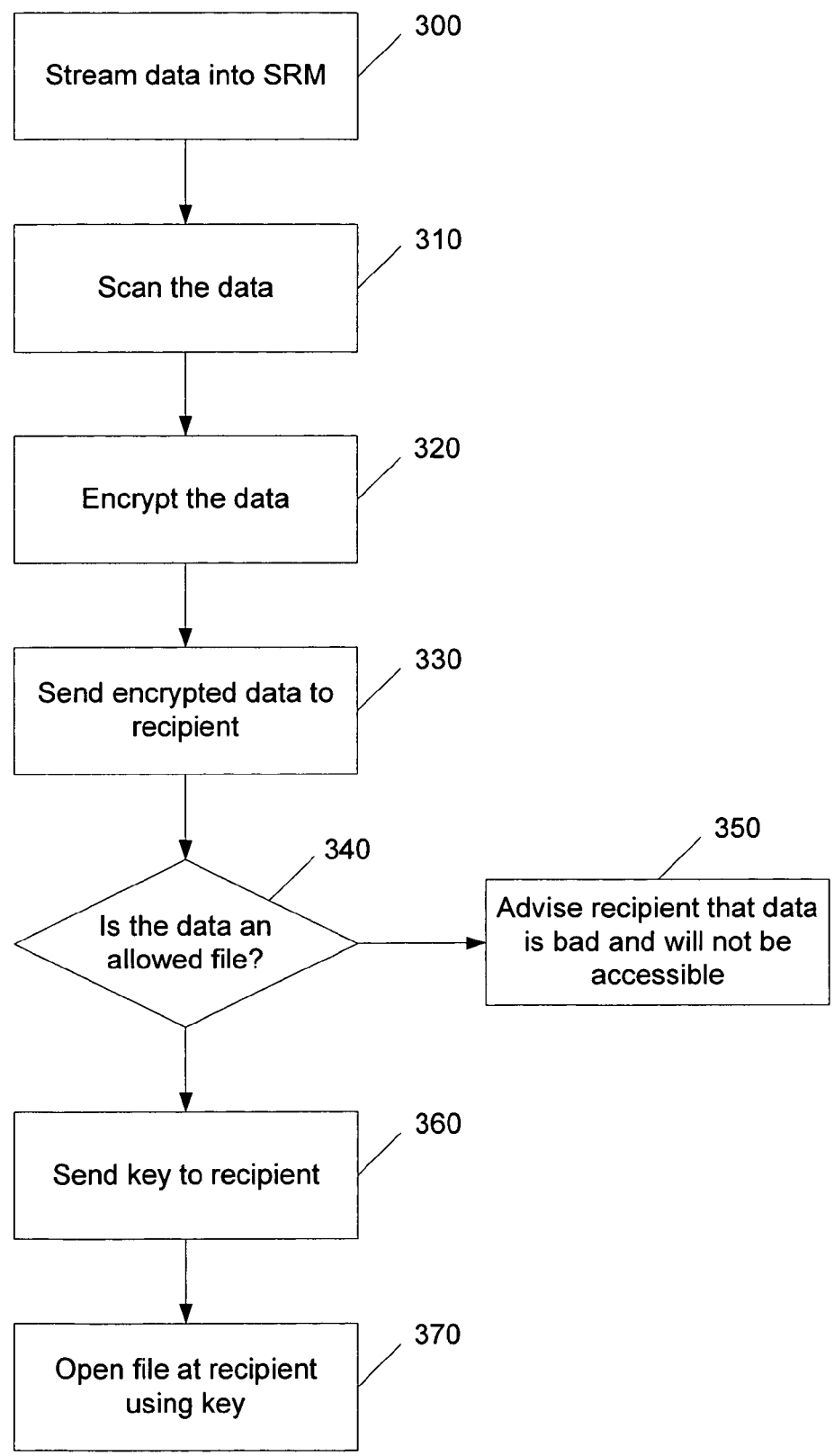
FIG. 3 is a flow diagram of an exemplary access control method.

More particularly, and with respect to the flow diagram of an exemplary method in FIG. 3, data is streamed into the SRM at step 300. As the data streams by, a scan engine is run at step 310, and the data is encrypted with a randomly generated key at step 320. It is contemplated that any known cryptographic technique may be used. The encrypted data is transmitted to the recipient at step 330. Thus, the recipient gets an encrypted file without the key.

The scan engine determines if the data is bad (not an allowed file) or not, at step 340. If the data is not allowed to be accessed or otherwise used by the recipient (e.g., because the data is bad), the recipient is advised at step 350 and the key is not sent to the recipient. At this point, the recipient has encrypted data that he cannot access or use.

If, on the other hand, the scan engine determines that the file is good, then the key is sent to the recipient at step 360. The recipient can then, at step 370, open the encrypted file that he has previously received and stored. The recipient may decrypt the data with the key. Thus, the recipient cannot use the data as it is streamed in, but desirably waits until the file has been received along with a key for decrypting the data. In an alternate embodiment, blocks of data (e.g., 1 MB) of the file could be received, approved, unlocked, and used at the recipient while subsequent blocks of data are being received at the recipient.

Thus, the control system makes access control decisions and performs content based filtering. However, the burden of storage is moved from the control system to the recipient.

It is contemplated that two cooperating access control systems could apply multiple SRM policies to a single transfer as long as they use a single encryption key.

Contents-based security policies in accordance with the invention may be implemented in many situations, including: (1) transfer of large files between different security partitions in a red/green system; (2) transfer of data over a communications link, such as Ethernet, TCP, WiFi, wireless modem, etc.; (3) implementing copyright restriction policies on streaming communications; (4) detecting viruses, spyware, spam email, confidential documents, or watermarks; and (5) handling compound documents where the security policy is applied to each sub-part of the document separately. If any part is disallowed, the compound document is desirably disallowed. Alternatively, the policy can be applied to each sub-part of the document separately by using different encryption keys for each sub-part.

Figure 4:
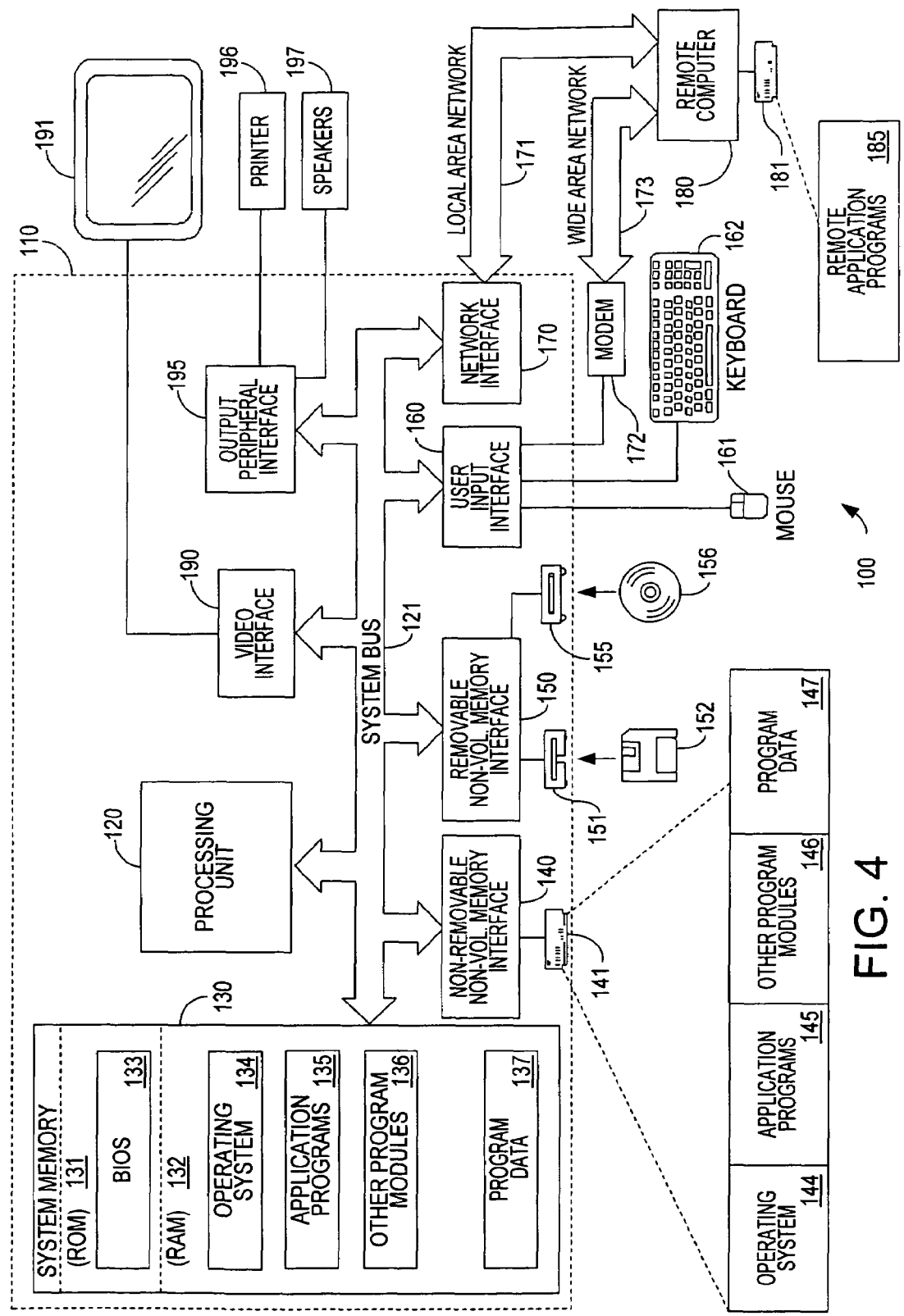
FIG. 4 is a simplified schematic illustrating an exemplary architecture of a computing device in which aspects of the invention may be implemented.

FIG. 4 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 4, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136 and program data 137.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet or electronic digitizer, a microphone, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 195 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention may be described in terms of software modules or components, those skilled in the art will recognize that such may be equivalently replaced by hardware components. Therefore, the invention as described herein contemplates all such embodiments as may come within the scope of the following claims and equivalents thereof.

What is claimed:

1. An access control method implemented on a computing device having a processor and memory on which is instantiated a security reference monitor (SRM), the method comprising:
    receiving, at the SRM, a stream of data from a first entity;
    scanning the streamed data with a scan engine of the SRM to determine, based on predetermined criteria, whether the streamed data should be withheld from an intended recipient of the streamed data;
    encrypting the streamed data with an encryptor of the SRM and according to a cryptographic key selected for the streamed data;
    transmitting, on-the-fly, the encrypted streamed data from the SRM to the intended recipient without storing the streamed data at the SRM; and
    determining, by a processor, to transmit the cryptographic key from the SRM to the intended recipient at the end of the transmission of the encrypted streamed data only if the scan engine of the SRM determines based on the predetermined criteria that the transmission should be allowed.

2. The method of claim 1, wherein encrypting is performed on-the-fly.

3. The method of claim 1, further comprising decrypting the encrypted data at the recipient using the key.

4. The method of claim 1, wherein the first entity and the recipient are different operating systems on a single computer, different applications within the same operating system, or different parts of the same operating system.

5. The method of claim 1, wherein if the data fails to meet the predetermined criteria, then advising the recipient that the encrypted data is not accessible to the recipient.

6. The method of claim 1, wherein the predetermined criteria comprises a virus check or a confidentiality check.

7. An access control system, comprising:
    a security reference monitor (SRM) that receives a stream of data from a first entity;
    an encryptor of the SRM that encrypts the streamed data according to a cryptographic key selected for the streamed data; and
    a scan engine of the SRM that scans the streamed data to determine based on predetermined criteria whether the streamed data should be withheld from an intended recipient of the streamed data,
    the SRM transmitting, on-the-fly, the encrypted streamed data to the intended recipient without storing the streamed data at the SRM; and
    the SRM transmitting the cryptographic key to the intended recipient only if the scan engine of the SRM determines, at the end of the transmission of the encrypted streamed data, based on the predetermined criteria, that the transmission should be allowed.

8. The system of claim 7, wherein the encryptor encrypts the data on-the-fly.

9. The system of claim 7, wherein the first entity and the recipient are different operating systems on a single computer, different applications within the same operating system, or different parts of the same operating system.

10. The system of claim 7, wherein if the data fails to meet the predetermined criteria, then the SRM advises the recipient that the encrypted data is not accessible to the recipient.

11. The system of claim 7, wherein the predetermined criteria comprises a virus check or a confidentiality check.

12. A security reference monitor (SRM), comprising:
    an input device that receives a stream of data from a first entity;
    an encryptor that encrypts the streamed data according to a cryptographic key selected for the streamed data; and
    a scan engine that scans the streamed data to determine based on predetermined criteria whether the streamed data should be withheld from an intended recipient of the streamed data,
    the SRM transmitting, on-the-fly, the encrypted streamed data to the intended recipient without storing the streamed data at the SRM,
    the SRM transmitting the cryptographic key to the intended recipient only if the scan engine of the SRM determines, at the end of the transmission of the encrypted streamed data, based on the predetermined criteria, that the transmission should be allowed.

13. The SRM of claim 12, wherein the encryptor encrypts the data on-the-fly.

14. The SRM of claim 12, wherein the first entity and the recipient are different operating systems on a single computer, different applications within the same operating system, or different parts of the same operating system.

15. The SRM of claim 12, wherein if the data fails to meet the predetermined criteria, then the SRM advises the recipient that the encrypted data is not accessible to the recipient.

16. The SRM of claim 12, wherein the predetermined criteria comprises a virus check or a confidentiality check.

* * * * *